Dec. 29, 1953          J. E. LA MARR          2,664,174
COMBINATION BRAKE AND STEERING ATTACHMENT FOR TOBOGGANS
Filed July 30, 1952                2 Sheets-Sheet 1
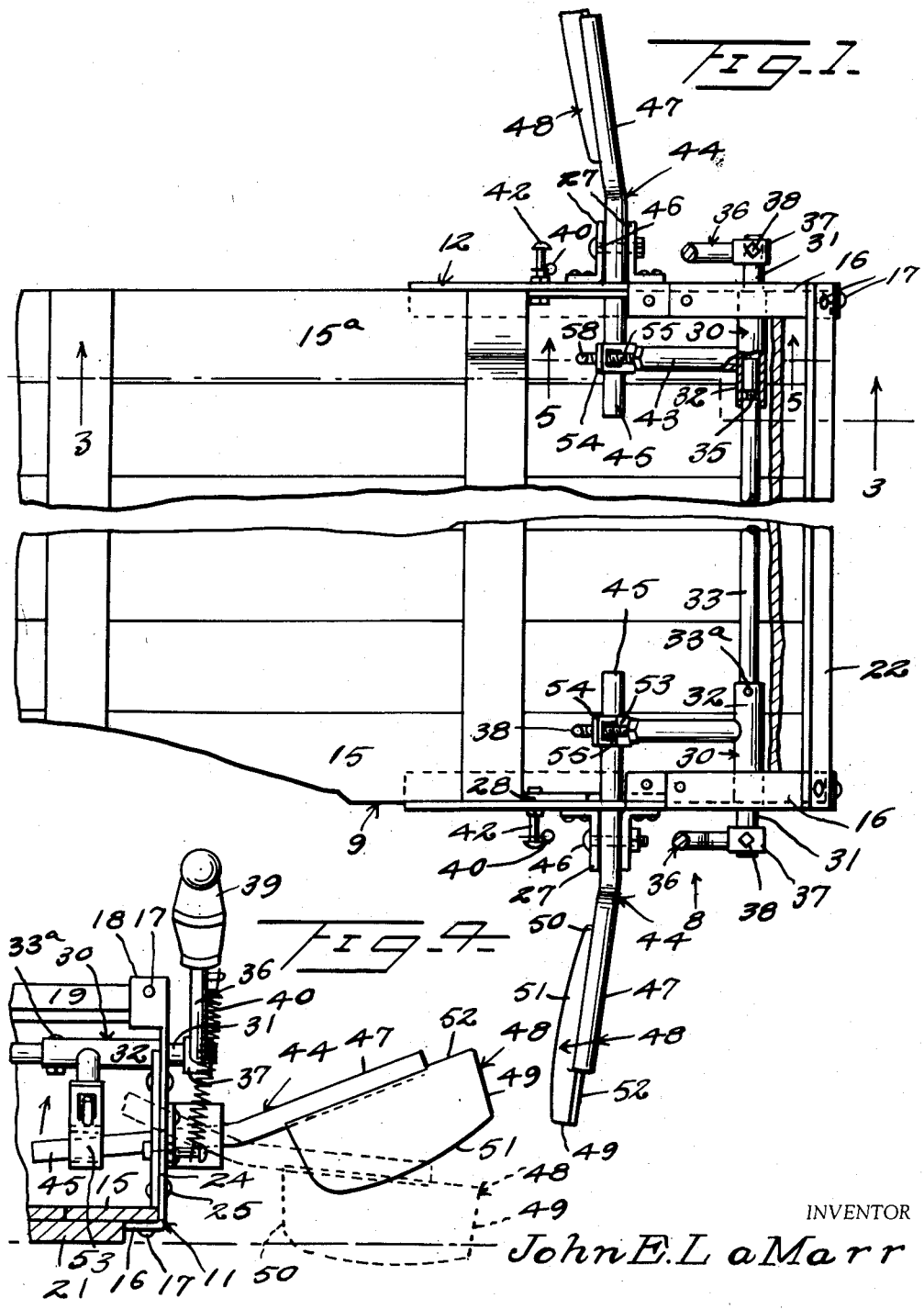
INVENTOR
John E. LaMarr
BY John H. Randolph
ATTORNEY

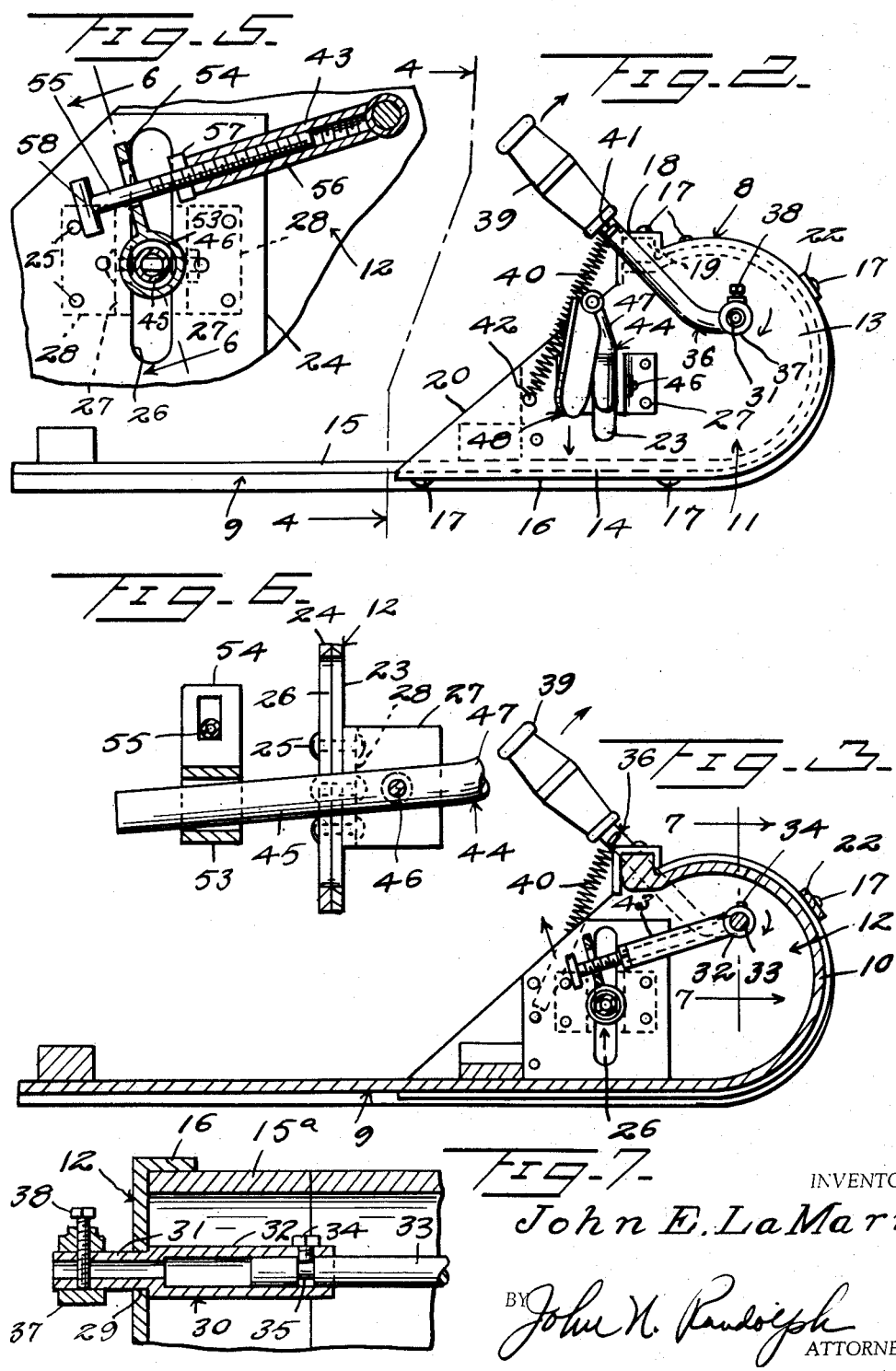

Patented Dec. 29, 1953

2,664,174

UNITED STATES PATENT OFFICE 2,664,174

COMBINATION BRAKE AND STEERING ATTACHMENT FOR TOBOGGANS

John E. La Marr, Torrance, Calif.

Application July 30, 1952, Serial No. 301,709

7 Claims. (Cl. 188—8)

1

This invention relates to a novel toboggan attachment of simple construction forming a complete unit capable of being readily attached to conventional toboggans to afford means whereby the toboggans may be readily controlled.

More particularly, it is an aim of the invention to provide a control unit forming a toboggan attachment which may be manually actuated for steering the toboggan either to the right or to the left, for stopping the toboggan or for simultaneously steering and checking the speed of travel of the toboggan.

Still a further object of the invention is to provide a control unit which may be readily attached to or removed from a conventional toboggan and which will effectively reinforce and strengthen the forward end thereof to which the unit is applied.

Various other objects and advantages of the invention will hereinafter become more fully apparent from the following description of the drawings, illustrating a presently preferred embodiment thereof, and wherein:

Figure 1 is a fragmentary top plan view, partly broken away, of the forward part of a conventional toboggan showing the brake and steering unit applied thereto;

Figure 2 is a fragmentary side elevational view of the forward end of a toboggan showing the brake and steering unit in side elevation;

Figure 3 is a longitudinal sectional view taken substantially along a plane as indicated by the line 3—3 of Figure 1;

Figure 4 is a partial across sectional view taken substantially along a plane as indicated by the line 4—4 of Figure 2;

Figure 5 is an enlarged fragmentary longitudinal sectional view taken substantially along a plane as indicated by the line 5—5 of Figure 1;

Figure 6 is a transverse vertical sectional view taken substantially along a plane as indicated by the line 6—6 of Figure 5, and Figure 7 is a transverse vertical sectional view taken substantially along a plane as indicated by the line 7—7 of Figure 3.

Referring more specifically to the drawings, for the purpose of illustrating the application and use of the combination brake and steering attachment for toboggans, designated generally 8 and comprising the invention, the forward end portion of a conventional toboggan is illustrated in certain of the views and designated generally 9, including the upwardly curved and turn back forward end 10.

The brake and steering unit 8 includes a right side plate 11 and a left side plate 12. The right side plate 11 has a rounded forward end portion 13 and a straight bottom portion 14 forming an

2 extension of the lower end of the rounded portion 13. The portions 13 and 14 fit against the outer edge of the outermost right hand side slat 15 of the toboggan 9. The plate 11 is provided with an inturned flange 16 extending the length of its edge portions 13 and 14 and which engages around a part of the outer side of the slat 15 and is secured thereto by fastenings 17. One end of the flange 16, located adjacent the top part of the side plate 11 terminates in an upwardly offset portion 18 which is secured to a top cross cleat 19 of the toboggan 9 by one of the fastenings 17 and which fits thereover. The side plate 11 has a downwardly and rearwardly inclined back edge 20 extending between the ends of the flange 16. As illustrated in Figures 2 and 4, the bottom portion of the flange 16 which is secured beneath the right-hand side slat 15 is offset upwardly with respect to the bottom surface 21 of the toboggan. The left-hand side plate 12 is identical in construction to the plate 11 and is mounted in the same manner on the left-hand side slat 15a, the side plates 11 and 12 differing from one another only in that they are constructed to fit the opposite sides of the front end of the toboggan 9 so that looking from the rear toward the front end of the toboggan, the flange 16 of the right-hand side plate 11 extends inwardly and to the left whereas the flange 16 of the left-hand side plate 12 extends inwardly and to the right. A tie bar 22 extends across the outer side of the front of the toboggan 9 and is secured at its ends to the flanges 16 of the side plates 11 and 12 by two of the fastenings 17.

Each side plate 11 and 12 rearwardly of the upper end of its flange 16 is provided with a vertically elongated slot 23. Each side plate has a reinforcing plate 24 secured to a portion of the inner side thereof by fastenings 25 and which is provided with a vertically elongated slot 26 which registers with the slot 23, as best illustrated in Figure 6. Each of the side plates is provided with a pair of outwardly projecting apertured ears 27 which straddle the slot 23 thereof and which ears are provided with outturned flanges 28 at their inner ends which bear against the outer side of the side plates and are secured thereto and to the reinforcing plate by certain of the fastenings 25, as best illustrated in Figures 5 and 6.

The side plates 11 and 12 adjacent their forward ends and in the upper part thereof are each provided with an opening 29, which openings are disposed in alignment. Each side plate 11 and 12 is provided with a shaft 30 having a restricted end portion 31 which extends outwardly through and is journalled in the side plate opening 29 thereof. The inner end of each shaft 30, designated 32, is larger in diameter than the opening 29 and extends inwardly from its side plate. The inner shaft ends 32 are hollow or tubular to receive the ends of a connecting rod 33. One end of the connecting rod 33 extends into the shaft portion 32 of the right-hand side plate 11 and is fixedly secured thereto by a fastening 33a which is detachable for removing the connecting rod therefrom. The opposite end of the connecting rod 33 is swivelly disposed in the shaft section 32 of the left-hand side plate 12 and is turnably connected thereto by means of a setscrew 34 which extends into an annular groove 35 of said last mentioned end of the connecting rod 33. The setscrew 34 is removable for disconnecting the rod 33 from said last mentioned shaft end 32.

An operating lever 36 is secured to the outer end of each shaft end 31, said levers each having an eye 37 at one end thereof which fits over its shaft end 31 outwardly of the adjacent side plate. The lever eyes 37 are secured by setscrews 38 to the shaft ends 31. Each lever 36 is provided with a handgrip 39 at its opposite, free end. A pull spring 40 is connected to each lever 36, adjacent its handgrip 39, by an anchoring eye 41. The pull springs 40 extend downwardly and rearwardly from the levers 36 and are anchored at their opposite ends to pins 42 which project outwardly from the side plates 11 and 12 and which are disposed rearwardly of the flanged ears 27. The springs 40 urge the levers 36 to swing downwardly and rearwardly to their normal positions as illustrated in Figures 2 and 3.

Each shaft portion 32 has a tubular internally threaded lever arm 43 fixed thereto and extending therefrom at a right angle to the axis of the shafts 30 and in a direction rearwardly of the toboggan 9. The lever arms 43 are disposed between the side plates 11 and 12. An elongated supporting arm 44 is swingably supported by each side plate 11 and 12, each supporting arm 44 including a substantially straight inner end portion 45 having an outer part extending loosely through the slots 23 and 26 and between the ears 27 of the side plate with which said supporting arm is associated, as best illustrated in Figure 6. An outer portion of each supporting arm part 45 has a pivot pin 46 extending therethrough the ends of which are anchored in the pair of ears 27 between which the arm portion 45 extends for mounting the supporting arm 44 for vertical swinging movement. As best illustrated in Figures 1 and 4, each supporting arm 44 includes an outer end portion 47 which is likewise substantially straight but disposed at a slight angle to the axis of its associated arm portion 45. The arm portions 47 normally extend at a slight angle upwardly and rearwardly from the outer ends of the inner arm portions 45 and are each spaced outwardly from the pairs of ears 27. Each arm portion 47 has a braking and steering blade 48 fixed thereto and supported thereby. The blades 43 are secured along upper edges thereof to the arm portions 47 and extend downwardly therefrom and are each inclined downwardly and rearwardly from their upper to their lower edges. Likewise, the blades 48 extend outwardly and rearwardly from their inner to their outer ends due to the rearwardly inclined disposition of the arm portions 47 by which the blades are supported. Accordingly, the outer ends 49 of the blades 48 are disposed rearwardly of the inner ends 50 of said blades and the bottom edges 51 of the blades 48, which are preferably convexly arced, are disposed in trailing positions with respect to the upper edges 52 of the blades which are secured to the arm portions 47.

A collar 53 is loosely mounted on the inner part of each arm portion 45. Each collar 53 has a slotted ear 54 which is fixed to and extends upwardly therefrom. A rod 55 extends forwardly through the slot of each ear 54 and has a threaded forward end portion which is threadedly secured in one of the lever arms 43. A locknut 57 threadedly engages a threaded portion 56 of each rod 55 and abuts against the free end of the lever arm 43 in which said rod is adjustably secured to retain it in various adjusted positions, as best illustrated in Figure 5. It will thus be seen that the rod may extend different distances from the lever arm 43. Each rod 55 is provided with a head 58 at its opposite end to prevent disengagement of the rods 55 from the ears 54 except when said rods are disengaged from the lever arms 43.

The springs 40 normally retain the levers 36 in their positions as illustrated in Figures 2 and 3 and so that the lever arms 43 are thus held in downwardly and rearwardly inclined positions, as illustrated in Figures 3 and 4. The rods 55, forming extensions of the lever arms 43, thus bear downwardly on the ears 54 to maintain the inner ends of the blade supporting arms 44 in depressed positions below the level of the pivots 46 of said arms, so that the outer portions 47 of the arms are maintained in elevated upwardly and outwardly inclined positions and so that the braking and steering blades 48 are thus maintained in elevated positions, as illustrated in Figure 2 and in full lines in Figure 4. When the blades 48 are thus supported in elevated, inoperative positions they will not engage the snow surface over which the toboggan 9 is traveling and accordingly will not affect movement of the toboggan. Due to a swivel connection of the connecting rod 33 to the shaft 30 of the left side plate 12, either shaft 30 may be turned independently of the other shaft by manual operation of its actuating lever 36. Accordingly, if it is desired to turn the toboggan to the right, the right-hand lever 36, disposed outwardly of the right side plate 11, is swung forwardly against the action of its spring 40 to cause the shaft 30, secured thereto, to rotate clockwise as seen in Figure 2 for swinging the lever arm 43 of said shaft and the rod 55 connected thereto upwardly. The rod 55 will exert an upward pull on the ear 54 and collar 53, connected to said rod, for swinging the inner end of the blade supporting arm 44 which is mounted on the side plates 11 upwardly and for thereby causing the outer end 47 of said blade supporting arm to swing downwardly to displace the blade 48, supported thereby, downwardly and into engagement with the snow surface over which the toboggan is traveling. As the blade 48 is spaced outwardly a substantial distance from the right-hand side of the toboggan 9, the resistance which the blade affords the forward travel of the toboggan will, as will be readily apparent, cause the toboggan to turn to the right. The other left-hand blade 48, disposed outwardly of the left side plate 12, may be similarly operated by forward displacement of the other left-hand actuating lever 36 for moving the left-hand blade into a surface engaging position to cause the toboggan to turn to the left. The springs 40 will promptly return either of the blades 48 to an elevated inoperative position and will return the other parts to their positions as illustrated in Figures 1, 2 and 3.

It will likewise be readily apparent that both blades 48 may simultaneously be swung downwardly into surface engaging operative positions by manually swinging both actuating levers 36 forwardly so that the two blades 48 will then counteract one another in reference to causing a turning of the toboggan and consequently will then function as brakes for checking the momentum of the toboggan and for completely stopping the toboggan, if desired. It will also be obvious that both blades 48 may be moved toward operative positions, one of the blades being displaced downwardly to a greater extent than the other blade to accomplish both a steering and braking action simultaneously. The blades 48 are inclined rearwardly from their inner to their outer ends so that said blades when in operative positions, as illustrated in dotted lines of Figure 4, will deflect the snow outwardly and away from the toboggan, so that the snow will not be deflected by the blades inwardly and toward the riders of the toboggan. Likewise, the blades are inclined downwardly and rearwardly so that said blades can be readily elevated by the springs 40 and will tend to exert an upward pressure on the supporting arm ends 47 when the blades are in operative positions. This constitutes an additional advantage since should either blade 48 strike an obstruction it will readily ride thereover whereas if the plane of the blade was vertical or inclined downwardly and forwardly the steering and braking unit would be readily damaged by either blade striking an obstruction while in an operative position. The levers 36 are arranged to be swung upwardly and forwardly for displacing the blades into operative positions thus counteracting a tendency of a toboggan rider to slide forward on the toboggan and which would otherwise occur if the actuating arms 36 were swung rearwardly to displace the blades 48 into operative positions.

The tie bar 22 relieves the forward end of the toboggan 9 from any torsional forces which would otherwise tend to spread the toboggan when the blades 48 are in applied positions.

Various modifications and changes are contemplated and may obviously be resorted to, without departing from the spirit or scope of the invention as hereinafter defined by the appended claims.

I claim as my invention:

1. A combination brake and steering attachment for toboggans comprising side plates adapted to be detachably secured to the side edges of the upwardly curved and turn back forward end of a toboggan, shaft members extending through and journalled in said side plates, an actuating lever fixed to each shaft member, said actuating levers being disposed outwardly of the side plates and being adapted to be manually operated for independently turning the shaft members, lever arms fixed to and projecting transversely from the shaft members and disposed between said side members, said side plates having vertically elongated slots, blade supporting arms extending through the slots of said side plates, means pivotally supporting said blade supporting arms intermediate of their ends on said side plates for vertical swinging movement, means loosely engaging inner ends of said blade supporting arms, disposed between the side plates, and loosely engaging said lever arms for connecting the lever arms and blade supporting arms, an elongated braking and steering blade secured to the outer end of each blade supporting arm outwardly of its side plate and having a longitudinal axis disposed substantially at a right angle to the planes of the side plates, said blades having upper edges secured to said outer end portions of the blade supporting arms and extending downwardly therefrom, said blades being supported by the blade supporting arms in elevated positions in one position of said actuating levers, said actuating levers being swingable in one direction longitudinally of the plates whereby said lever arms will exert an upward pull on the inner ends of the blade supporting arms through the means loosely connecting the lever arms and blade supporting arms for causing the outer ends of the blade supporting arms and blades to be swung downwardly to position the blades in engagement with a surface over which the toboggan is traveling.

2. A brake and steering attachment for toboggans as in claim 1, said lever arms being independently swingable for selectively moving the blades into surface engaging positions for steering the toboggan or being swingable in unison for simultaneously moving the blades into surface engaging positions for checking the momentum of the toboggan, and spring means connected to said side plates and actuating levers for swinging the actuating levers in one direction to normally urge and retain the blades in elevated, inoperative positions.

3. A brake and steering attachment for toboggans as in claim 1, a connecting rod extending between and detachably connected to said shaft members, and means swivelly connecting one of said shaft members to the connecting rod for rotation of the shaft members independently of one another.

4. A brake and steering attachment for toboggans as in claim 1, and a bar extending between and connecting said side plates adjacent their forward ends, said bar being disposed externally of a part of the forward end of the toboggan.

5. A brake and steering attachment for toboggans as in claim 1, said side plates having rounded forward ends and substantially straight bottom edges and being provided with inwardly extending flanges projecting from said rounded forward ends and bottom edges and overlying and secured to the forward end and portions of the underside of the toboggan.

6. A brake and steering attachment for toboggans as in claim 1, the outer end portions of said blade supporting arms being disposed at an angle to the inner end portions thereof and being inclined upwardly and rearwardly relatively to said inner end portions.

7. A brake and steering attachment for toboggans as in claim 6, said blades being inclined downwardly and rearwardly from the outer end portions of said blade supporting arms and extending outwardly and rearwardly from their inner to their outer ends.

JOHN E. LA MARR.

References Cited in the file of this patent

UNITED STATES PATENTS

| Number | Name | Date |
| --- | --- | --- |
| 175,284 | Crossman | Apr. 11, 1876 |
| 349,152 | Ferguson | Sept. 14, 1886 |
| 384,548 | Thompson | June 12, 1888 |
| 397,231 | Gretzler | Feb. 5, 1889 |
| 624,498 | James | May 9, 1899 |
| 1,613,508 | Gardner | Jan. 4, 1927 |